Nov. 16, 1954   B. E. RICKS ET AL   2,694,528
AUTOMOBILE HEATER
Filed July 24, 1952
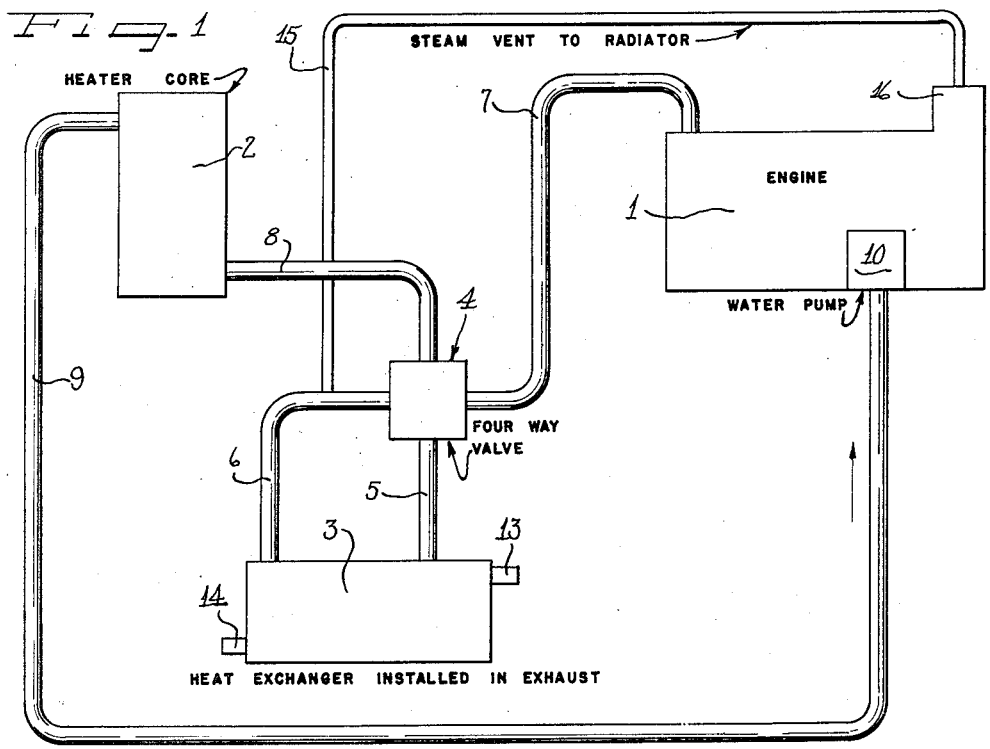
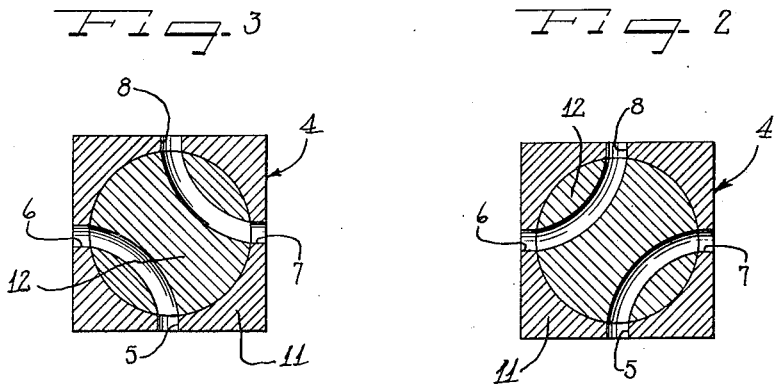
Inventor
Bernard E. Ricks
James H. Booth
By Hill, Sherman, Meroni, Gross & Simpson Attys

United States Patent Office 2,694,528
Patented Nov. 16, 1954

2,694,528

AUTOMOBILE HEATER

Bernard E. Ricks, Detroit, and James H. Booth, Venice, Mich., assignors to Thompson Products, Inc., Cleveland, Ohio, a corporation of Ohio Application July 24, 1952, Serial No. 300,602

7 Claims. (Cl. 237—12.3)

This invention relates to automobile heating systems. More particularly, the invention is concerned with a heating system wherein the engine block as well as the interior of the automobile are rapidly brought up to the desired operating temperature.

Present day automobile heaters used for raising the temperature of the interior of the automobile body in cold weather may be generally classified into three basic groups. These groups are (1) hot water heaters which derive their heat from the cooling system of the automobile engine; (2) exhaust gas heaters which derive the heat from the exhaust manifold or muffler pipe of the engine; and (3) the gasoline heater which operates independently of the automobile engine or power system. Each of these systems as presently utilized has one or more serious defects.

The hot water system suffers from the fact that in general use a rather lengthy period of time must elapse before the heating medium reaches a temperature which is sufficient to provide adequate heat. This is due to the fact that, thermostats notwithstanding, the cooling fluid of the automotive engine comes up to its operating temperature rather slowly. This is especially true in cold weather and of course the heating system is required only in such weather. It has been found therefore that for many uses such as very short trips, systems utilizing the hot water type of heater fail to provide adequate heat until the need is past. While it is of course possible to follow the practice of starting the automobile several minutes ahead of time to thereby warm the car before the trip is started, this is not only time-consuming but a nuisance.

Heating systems utilizing the heat source of the exhaust system generally overcome the difficulties above mentioned. The exhaust system of an automobile is the first part of the power system to become heated since the burning exhaust gases pass directly therethrough. However, exhaust gases contain gases such as carbon-monoxide which are highly dangerous to the occupants of the automobile. While there is seldom any danger of such gases leaking into the body compartment of the automobile when the heater is new, the possibility greatly increases with the age of the vehicle since the muffler pipe or manifold may corrode from the effects of the exhaust gases until openings occur between the heating air chamber and the exhaust manifold of muffler pipe. As a result of this danger, heater systems utilizing the exhaust gases are generally in disfavor.

The gasoline heater of course provides satisfactory heating quite rapidly. However, many automotive drivers hesitate to use a heater utilizing a flame within the automobile body compartment, and in any case such heaters require extra gasoline for their operation. While the amount of gasoline required may be relatively small, nevertheless, it does increase the operating cost of the vehicle during the winter months. Since both the hot water and exhaust type heaters utilize heat generally considered waste, and are therefore more economical, a large number of automobile owners accept their disadvantages rather than suffer increased operating costs.

It is further noted that none of these arrangements aids the automobile engine to warm up quickly. During the winter months, the rapid warming up of the engine is very desirable from the economy standpoint as well as for heating purposes.

The present invention contemplates a heating system wherein the advantages found in the exhaust gas heating system are utilized in the heating of the automobile both as to heating the interior of the automobile and as to rapidly bringing the motor to its optimum operating condition, while the disadvantages generally associated with this system are eliminated. In accomplishing this result, a novel circulation system is provided for circulating the engine cooling water. Initially, the cooling water is passed through a heat exchanger utilizing the hot exhaust gases wherein the cooling water is rapidly heated up. Upon reaching the desired operating temperature, the exhaust gas heat exchanger is eliminated from the circuit and water is circulated through the ordinary automobile hot water heater directly from the motor cooling system.

It is therefore an object of this invention to provide a novel automobile heating system utilizing waste gases for rapidly bringing the engine and the interior of the automobile to the desired operating temperature.

A further object of the present invention is to provide a rapidly heating yet extremely safe automotive heating system.

Still a further object of the instant invention is the provision of an automotive heating system which not only rapidly heats the automobile interior but also quickly brings the the operating temperature of the engine up to its desired level.

Yet another feature of the invention is the provision of a novel valve arrangement for automotive heating systems whereby one source of heat may be utilized during the warming up period and a second source utilized during normal operation.

A further feature of the present invention is the provision of a novel heating arrangement for the warming up of automobile engines.

Still a further object is the elimination of the possibility of exhaust gases escaping into the interior of the automobile through the heat exchanger utilized in heating the automobile's interior.

A further feature of the present invention is the provision of a heating system wherein heat is initially supplied to the engine cooling system and the automotive automobile body by an exhaust gas to water heat exchanger, and wherein the heat exchanger is removed from the circuit upon the arrival of the cooling water at a predetermined operating temperature, with the engine thereafter supplying heat to the automobile body compartment heater.

Other objects and features of this invention will more fully appear from the following detailed description taken in connection with the accompanying drawings which illustrate a preferred embodiment thereof.

On the drawings:

Figure 1 is a schematic diagram of the overall heating system with the names of the individual parts indicated thereon;

Figure 2 is a schematic disclosure of the four-way valve with the ports in the position occupied during the first phase or engine starting period of operation; and Figure 3 is a schematic figure of the four-way valve showing the ports in the position occupied after the exhaust-gas-to-cooling-water heat transfer unit has been disconnected from the circuit.

As shown on the drawings:

As shown in Figure 1, the heating system of our invention comprises a plurality of elements now generally known in the art. An automobile engine is indicated at 1. An automobile body compartment heater is generally indicated at 2 and an exhaust gas to water heat exchanger is generally indicated at 3. These elements are interconnected by means of the novel system hereinafter explained.

A four-way valve indicated at 4 is connected to the heat exchanger 3 by means of the conduits 5 and 6. The valve is also connected to the conduit 7 which leads to the water cooling system of the engine 1. A conduit 8 connects the valve 4 with the heater 2 from which a conduit 9 extends back to the cooling system of the engine 1. The water pump 10 is provided at the automobile engine for purposes of maintaining a fluid circulation in the system. In the arrangement shown, the high pressure side of the water pump discharges cooling water into the conduit 7, while the low pressure or inlet side of the pump is connected to the conduit 9.

As shown in Figure 2, the four-way valve 4 comprises a housing 11 having four ports each of which leads into one of the conduits 5, 6, 7 or 8. Within the housing 11 a rotatable valve core member 12 is positioned. While it is not shown in the drawings it is contemplated that the valve core 12 be operated either manually or by means of a thermostatically controlled element which is responsive to the temperature of the water in the engine water circulating system, preferably at a point in the conduits 7 or 9. As may be seen from Figures 2 and 3, the four-way valve core 12 has two operative positions. In the first position, which is shown in Figure 2, the conduits 5 and 7 are connected to each other and the 6 and 8 are likewise connected. In the Figure 3, which discloses the second position, the conduits 7 and 8 are connected, as are the conduits 5 and 6.

In operation in cold weather for example, the engine 1 is started in the usual manner. Immediately after the engine starting moment, the fluid in all of the conduits 5, 6, 7, 8 and 9 is at approximately atmospheric temperature. However, as soon as the engine begins to turn over, exhaust gases, which are the waste products of combustion, begin to pass through the heat exchanger 3 by means of the pipes 13 and 14. At the same time, the valve 4 is in the position indicated in Figure 2, and the water pump 10 is operating to circulate water through the conduits 7 and 9 in the direction of the arrows shown in Figure 1. Under this arrangement of the component parts, water circulates from the conduit 7 through the conduit 5 through the heat exchanger 3 to the conduit 6, from the conduit 6 through the valve 4 to the conduit 8, from the conduit 8 through the heater 2 to the conduit 9 and from thence to the low pressure side of the water pump 10.

It is apparent that during this operation the water immediately begins to be heated by the heat exchanger 3 which has a relatively high and rapidly developed heat input. At the same time, heat begins to develop in the engine 1, which heat is also added to the fluid flowing in the conduits 5 through 9. As the temperature of the water in the circuit increases to the desired operating level, the need for the large heat input of the heat exchanger 3 is removed. Accordingly, as soon as the operating temperature is reached, the valve core 12 is rotated either by means of thermostatically controlled element or by hand to the position indicated in Figure 3.

During operation of the system with the valve core in the position indicated in Figure 3, water is circulated directly from the conduit 7 to the conduit 8 without passing through the heat exchanger 3. At the same time, water already in the heat exchanger 3 is confined therein. When the temperature of the water in the heat exchanger 3 reaches the boiling point, it converts into steam and passes out through the constricted steam vent 15 to the automobile radiator 16 where it condenses back into fluid.

It should be noted that the operation of the system in the position shown in Figure 2 is not seriously affected by the presence of the vent 15 which forms a partial bypass. This is true since the vent 15 is of a smaller diameter than the conduits 8 and 9. The resistance of the fluid path through these conduits and the heater 2 is less than that of the restricted vent 15. Therefore, only a small portion of the fluid travels through vent 15 when the valve 4 is in the position shown in Figure 2.

Upon completion of the trip and the discontinuation of operation of the engine 1 the fluid in the system will cool down to a point where the thermostatically controlled valve 4 will return to the position indicated in Figure 2. Of course, if the system is manually controlled, the valve 4 must be returned to the position shown in Figure 2 by the operator at the time he again placed the automobile in operation.

The advantages of the instant invention are readily apparent from the above disclosed construction. It will be seen that the advantage of the use of an exhaust gas type of heater are maintained by utilizing them to provide a rapid source of heat during the initial moments of operation. The advantages of a hot water heater are also maintained in that there is no danger of any exhaust gases entering the compartment of the automobile. It is apparent that if any leakage of the exhaust gases did occur it would merely cause introduction of such gases into the cooling fluid, which system is in turn separate from the air heated by the heater 2.

The present invention also provides for the very rapid heating of the engine 1 to its operating temperature range by the introduction of an extra source of heat to the engine cooling water. This is a very great improvement since it reduces the length of time during which the choke must be operated, thereby increasing the fuel economy and also preventing any tendency of the automobile to stall or die as a result of improper choke operation.

It is apparent, therefore, that we have devised a novel automobile heating system constituting a great advance in the automotive art.

It will be understood of course that modifications and variations may be effected without departing from the scope of the novel concepts of the present invention.

We claim as our invention:

1. In a heating apparatus for use with mechanisms having a water cooled engine, a first exhaust gas-to-water heat exchanger and a second water-to-air heat exchanger, a conduit system for said heat exchangers comprising a four-way valve, a water inlet to said valve from said engine cooling water, a water outlet from said valve into said first heat exchanger, a water inlet to said valve from said first heat exchanger and a water outlet from said valve to said second heat exchanger, and a conduit from said second heat exchanger to said engine cooling system.

2. An automotive heating system comprising an engine having a cooling water jacket, first exhaust gas-to-water heat exchanger means, second water-to-air heat exchanger means and a four-way control valve system, said control valve system comprising a first conduit from said engine water jacket to said valve, a second conduit from said valve to said first heat exchanger, a third conduit from said first heat exchanger to said valve, a fourth conduit from said valve to said second heat exchanger and a fifth conduit from said second heat exchanger to said engine water jacket whereby engine cooling water may be selectively circulated through said first heat exchanger and said second heat exchanger back to said engine water jacket or may be by-passed through said second heat exchanger directly.

3. A heating system comprising an apparatus which produces exhaust gases and which has a water cooling jacket for carrying the heat of combustion away, a first heat exchanger for transferring heat from said exhaust gases to said water, a second heat exchanger for transferring heat from said water to surrounding air, a control valve, and a conduit system for connecting said water jacket, first heat exchanger and said second heat exchanger to each other, said conduit system comprising a first conduit from said water jacket to said valve, a second conduit from said valve to said first heat exchanger, a third conduit from said heat exchanger to said valve, a fourth conduit from said valve to said second heat exchanger and a fifth conduit from said heat exchanger back to said water jacket.

4. A heat exchanger system comprising a combustion engine having hot exhaust gases and a first combustion chamber-to-water jacket heat exchange means, second heat exchanger means for transferring heat from said exhaust gas to said cooling water, third heat exchanger means for transferring heat from said cooling water to surrounding atmosphere, a four-way fluid control valve, a water circulating conduit system, and a water circulating pump means, said conduit system comprising a first conduit connecting the high pressure side of said pump to said first heat exchanger, a second conduit connecting said first heat exchanger to said valve, a third conduit for connecting said valve to said second heat exchanger, a fourth conduit for connecting said second heat exchanger to said valve, a fifth conduit for connecting said valve to said third heat exchanger, and a sixth conduit for connecting said third heat exchanger to the intake side of said pump, said valve being operable to a position which circulates water from said second conduit through said third conduit to said second heat exchanger to said fourth conduit to said fifth conduit to said third heat exchanger and from thence to said sixth conduit, or to a second position wherein said water is circulated from said second conduit directly to said fifth conduit to said third heat exchanger and from thence to said sixth conduit whereby during operation of the system in said first valve position the cooling water is heated by said first heat exchanger and said second heat exchange means and in said second position is heated by the first heat exchange means only.

5. A heat exchange system for producing a rapid warming up of an automobile engine and hot water heater which comprises a first engine exhaust gas-to-water heat exchanger, a second water-to-ambient atmosphere heat exchanger, an engine water jacket for carrying away combustion chamber heat, a control valve, and a conduit system, said conduit system comprising a first conduit connecting said water jacket to said valve, a second conduit connecting said valve to said first heat exchanger, a third conduit connecting said first heat exchanger to said valve, a fourth conduit connecting said valve to said second heat exchanger, a fifth conduit connecting said second heat exchanger to said water jacket and a sixth restricted conduit connecting said third conduit to said radiator, said control valve being operable from a position wherein said first and second conduits as well as said third and fourth conduits are in connection to a position in which said first and fourth as well as said second and third conduits are interconnected, whereby the temperature of said cooling water will be rapidly heated by said first heat exchanger when said valve is in said first position and whereby said first heat exchanger will be by-passed in said second position of said valve to thereby limit the heat input into the circulating water to that supplied through the engine water jacket.

6. An engine heat exchange system comprising first means for adding heat to the engine cooling water, second means for adding heat to the engine cooling water, third means for transferring heat from said cooling water to the ambient atmosphere within said automobile body, and means for selectively including or excluding the transfer of heat by said second means to said cooling water, said means comprising a four-way valve having a first position in which said second means is connected in series with said first means and said third means and a second position in which said second means is short circuited and eliminated entirely from any connection with said first or said third means.

7. A heat transfer system for use in automobiles having a water cooled engine and a body compartment, which comprises first means for transferring heat from said engine to said cooling water, second means for transferring heat from engine exhaust gases to said cooling water, third means for transferring heat from said cooling water to the ambient atmosphere within said body compartment and fourth means for selectively connecting said second means into said heating system whereby during an initial period of engine operation heat will be supplied to said cooling water by both said first and said second heat transfer means and whereby during a second period of operation, heat will be transferred to said cooling water from said first heat transfer means only, said fourth means comprising a four-way valve which simultaneously disconnects said second means from said first and third means and short circuits said second means.

References Cited in the file of this patent

UNITED STATES PATENTS

| Number | Name | Date |
| --- | --- | --- |
| 1,775,638 | Gould | Sept. 16, 1930 |
| 2,018,339 | Angstman | Oct. 22, 1935 |
| 2,105,193 | Kysor | Jan. 11, 1938 |
| 2,176,282 | Triplett | Oct. 17, 1939 |
| 2,258,324 | Hans | Oct. 7, 1941 |
| 2,444,537 | Seldon | July 6, 1948 |